(12) United States Patent
Haruna

(10) Patent No.: US 10,751,842 B2
(45) Date of Patent: Aug. 25, 2020

(54) OUTPUT DEVICE

(71) Applicant: KOSMEK LTD., Hyogo (JP)

(72) Inventor: Yosuke Haruna, Hyogo (JP)

(73) Assignee: KOSMEK LTD., Hyogo (JP)

( * ) Notice: Subject to any disclaimer, the term of this patent is extended or adjusted under 35 U.S.C. 154(b) by 0 days.

(21) Appl. No.: 15/507,362

(22) PCT Filed: Oct. 6, 2015

(86) PCT No.: PCT/JP2015/078283
§ 371 (c)(1),
(2) Date: Feb. 28, 2017

(87) PCT Pub. No.: WO2016/056531
PCT Pub. Date: Apr. 14, 2016

(65) Prior Publication Data
US 2017/0291266 A1    Oct. 12, 2017

(30) Foreign Application Priority Data

Oct. 10, 2014  (JP) .................................. 2014-220783

(51) Int. Cl.
*B23K 37/053* (2006.01)
*B23Q 1/00* (2006.01)
(Continued)

(52) U.S. Cl.
CPC .......... *B23K 37/053* (2013.01); *B23Q 1/0081* (2013.01); *F16B 2/16* (2013.01);
(Continued)

(58) Field of Classification Search
CPC ...... B23K 37/053; B23Q 1/0081; B23Q 3/00; B23Q 3/06; B25B 11/00; B25B 19/00;
(Continued)

(56) References Cited

U.S. PATENT DOCUMENTS 2,424,090 A * 7/1947 Gordinier .............. B23Q 3/108
269/234
3,168,341 A * 2/1965 Beaudet .................. F16B 21/18
285/319
(Continued)

FOREIGN PATENT DOCUMENTS

CN      101422883 A    5/2009
CN      102619822 A    8/2012
(Continued)

OTHER PUBLICATIONS

Chinese Office Action in corresponding Chinese Application No. 201580049812.8, dated Jun. 5, 2018.
(Continued)

*Primary Examiner* — Joseph J Hail
*Assistant Examiner* — Arman Milanian
(74) *Attorney, Agent, or Firm* — Bacon & Thomas, PLLC

(57) ABSTRACT

A first rod (21) is inserted into a first guide hole (11) so as to be movable in a vertical direction. A second rod (22) is inserted into a second guide hole (12), which crosses the first guide hole (11), so as to be movable in a horizontal direction. An accommodation groove (31) is disposed in a lower half portion of the first rod (21). The second rod (22) is provided with an insertion portion (32) to be fitted in the accommodation groove (31). A cam groove (38) provided in the insertion portion (32) is fitted over a pin (35) provided in the lower half portion of the first rod (21). A drive transmission (D) connected to the second rod (22) moves the second rod (22) in the horizontal direction.

5 Claims, 4 Drawing Sheets

(51) Int. Cl.
  *F16B 21/16* (2006.01)
  *F16B 2/16* (2006.01)
  *F16B 1/00* (2006.01)
  *F16B 21/18* (2006.01)

(52) U.S. Cl.
  CPC ............ *F16B 21/165* (2013.01); *F16B 1/005* (2013.01); *F16B 21/18* (2013.01)

(58) Field of Classification Search
  CPC .......... F16B 1/005; F16B 2/16; F16B 21/165; F16B 21/18
  USPC .......................................... 269/21, 309, 310
  See application file for complete search history.

(56) References Cited

U.S. PATENT DOCUMENTS

| | | | | |
|---|---|---|---|---|
| 3,421,750 | A * | 1/1969 | Tridgell | B23Q 3/108 188/129 |
| 3,792,855 | A * | 2/1974 | Bondie | B23Q 3/103 269/310 |
| 4,471,680 | A * | 9/1984 | Gerhart | B21D 28/002 83/588 |
| 4,867,621 | A * | 9/1989 | Morghen | B23Q 3/108 409/218 |
| 5,678,468 | A * | 10/1997 | Lozano Bonet | B21D 28/32 384/42 |
| 5,713,564 | A * | 2/1998 | Schindler | B23Q 3/108 269/309 |
| 5,881,625 | A * | 3/1999 | Wellman | B21D 28/34 234/114 |
| 6,702,246 | B1 * | 3/2004 | Schriever | F16M 7/00 248/656 |
| 7,204,181 | B2 * | 4/2007 | Goedeking | B21D 28/34 234/114 |
| 2004/0144230 | A1 * | 7/2004 | Oshita | B21D 28/34 83/684 |

FOREIGN PATENT DOCUMENTS

| | | | | |
|---|---|---|---|---|
| CN | 102744623 | A | | 10/2012 |
| DE | 29810585 | U1 | | 9/1998 |
| DE | 298 10 585 | U1 | | 10/1998 |
| GB | 2494306 | A | * | 3/2013 ............. F16B 7/042 |
| GB | 2494306 | A | | 3/2013 |
| JP | 5231411 | | | 3/1977 |
| JP | 347729 | | | 5/1991 |
| JP | H03-47729 | U | | 5/1991 |
| JP | H05-231411 | A | | 9/1993 |
| JP | 2000-317541 | A | | 11/2000 |
| JP | 2000317541 | A | | 11/2000 |
| JP | 2000317541 | A | * | 11/2000 ............. B23Q 3/18 |
| JP | 2010-105111 | A | | 5/2010 |
| JP | 2010105111 | A | | 5/2010 |
| WO | 2014/087116 | A1 | | 6/2014 |

OTHER PUBLICATIONS

Japanese Office Action in corresponding Japanese Application No. 2014-220783, dated Jul. 10, 2018.
Microfilm of the specification and drawings annexed to the request of Japanese Utility Model Application No. 110261/1989 (Laid-open No. 47729/1991) (Komatsu Ltd.,).
International Search Report for PCT/JP2015/078283 dated Nov. 13, 2015.
Supplementary European Search Report in corresponding European Application No. EP 15849000.3, dated Jul. 26, 2017.
Office Action dated Apr. 24, 2018, in corresponding Japanese Application No. 2014-220783.
Office Action dated Sep. 13, 2018, in corresponding Taiwan Application No. 10-4133223.
Office Action dated May 23, 2019, in corresponding European Application No. 15849000.3.
Office Action dated Jun. 10, 2020, in corresponding Chinese Application No. 2019 10147843.7.

* cited by examiner

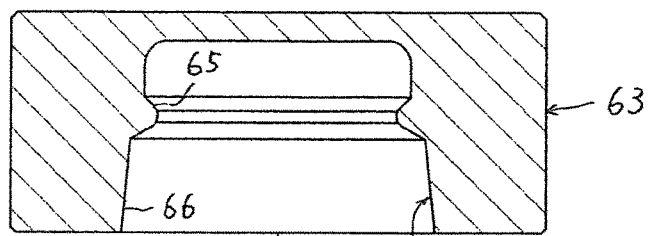
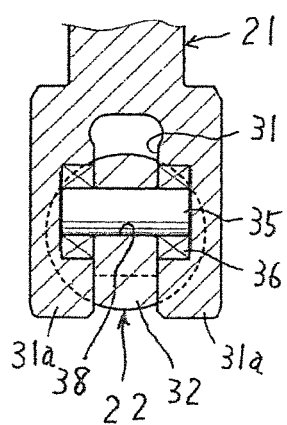
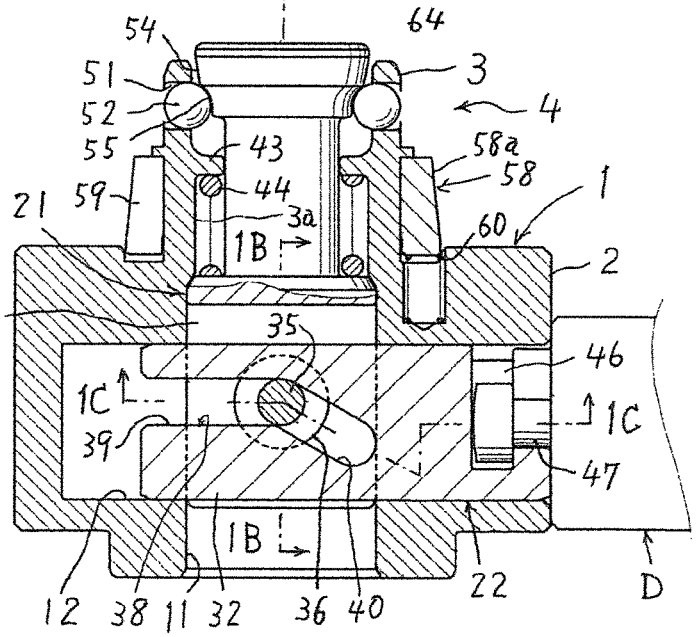
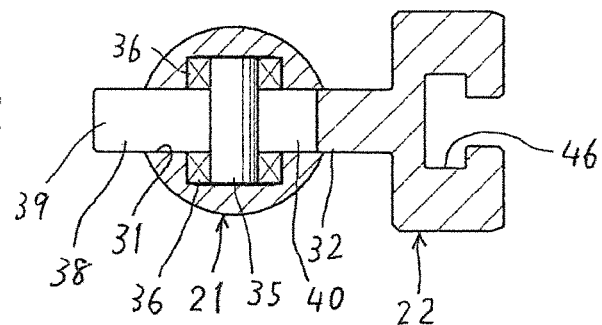

FIG.4A
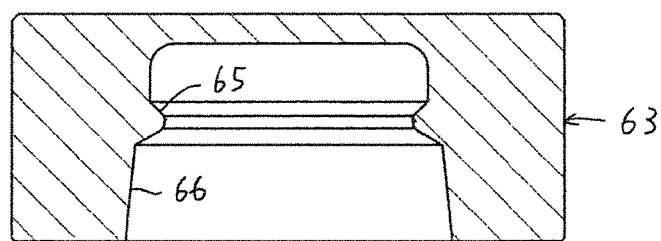
FIG.4B
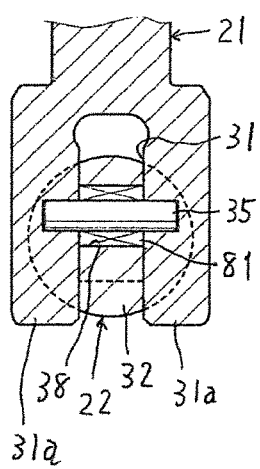
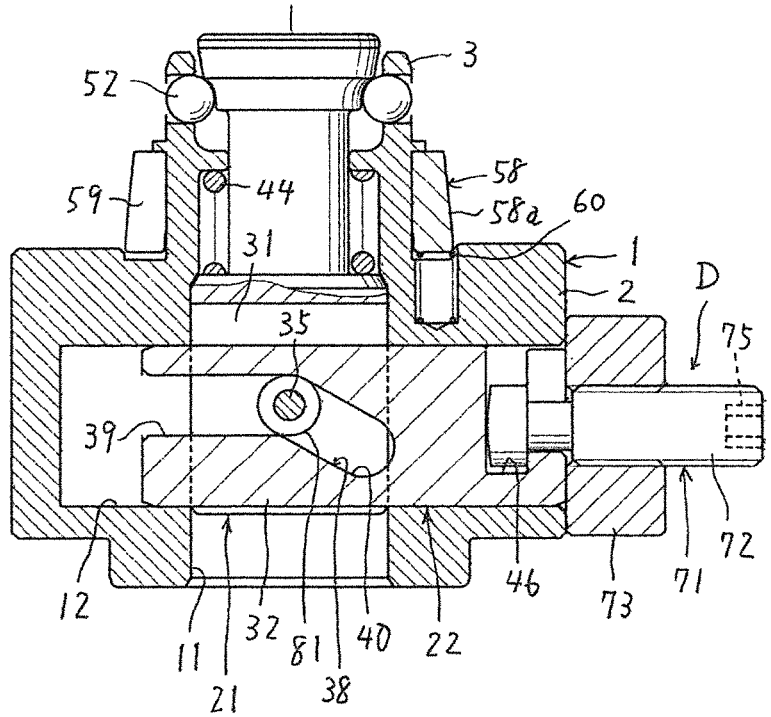

OUTPUT DEVICE

TECHNICAL FIELD

The present invention relates to an output device suitable for being used in a positioning clamp.

BACKGROUND ART

Known examples of such an output device include a device described in Patent Literature 1 (Japanese Unexamined Patent Publication No. 2010-105111). The known device is structured as follows.

Two left and right wedges (a fastening driving wedge and a release driving wedge) are disposed respectively to the left and right of a lower half portion of an output rod (fastening-release driven wedge). An upper inclined surface of the left wedge is structured to be capable of fitting on an upper inclined surface of the output rod, and a lower inclined surface of the right wedge is structured to be capable of fitting on a lower inclined surface of the output rod.

CITATION LIST

Patent Literature

Patent Literature 1: Japanese Unexamined Patent Publication No. 2010-105111

SUMMARY OF INVENTION

Technical Problem

The above-described known output device has a complicated structure, which incurs a high production cost. In addition, the known device is disadvantageous in its large size.

An object of the present invention is to propose an output device which improves the above-described disadvantages.

Solution to Problem

In order to achieve the above object, the present invention structures an output device as follows, for example, as shown in FIG. 1A to FIG. 2B or in FIG. 3, or as shown in FIG. 4A and FIG. 4B.

A first guide hole 11 is disposed in a housing 1, and a second guide hole 12 is disposed so as to cross a base-side portion of the first guide hole 11. A first rod 21 for output is inserted into the first guide hole 11 so as to be movable in an axial direction of the first rod 21. A second rod 22 for driving is inserted into the second guide hole 12 so as to be movable in an axial direction of the second rod 22. An accommodation groove 31 is disposed in one of two members which are the base-side portion of the first rod 21 and the second rod 22, the accommodation groove 31 extending in the axial direction of the second rod 22. An insertion portion 32 provided to the other of the two members is inserted into the accommodation groove 31. A guide member 35 is provided in the base-side portion of the first rod 21. A cam groove 38 is provided in the second rod 22 so as to be directly or indirectly make an engagement with the guide member 35. The cam groove 38 has a driving groove portion 40 extending so that the distance from the axis of the second rod 22 increases toward one of both axial ends of the second rod 22. A drive transmission D connected to the second rod 22 moves the second rod 22 in the axial direction of the second rod 22.

The present invention brings about the following functions and effects. The device of the present invention has a simpler structure than the aforementioned known device. Thus, in addition to a reduction in production cost, downsizing of the device is achievable.

In the present invention, it is preferable that the accommodation groove 31 is disposed in the base-side portion of the first rod 21, and the insertion portion 32 is provided to the second rod 22.

Further, in the present invention, it is preferable that both side walls 31a, 31a of the accommodation groove 31 respectively support both longitudinal end portions of the guide member 35 in a rotatable manner, and a longitudinally central portion of the guide member 35 is engaged in the cam groove 38 provided in the insertion portion 32.

Furthermore, in the present invention, it is preferable that both side walls 31a, 31a of the accommodation groove 31 respectively support the longitudinal end portions of the guide member 35 in a rotatable manner via rollers or bearings 36.

Further, in the present invention, it is preferable that, as shown in FIG. 4A and FIG. 4B, for example, both side walls 31a, 31a of the accommodation groove 31 respectively support both longitudinal end portions of the guide member 35, and a longitudinally central portion of the guide member 35 is engaged, via a roller or a bearing 81, in the cam groove 38 provided in the insertion portion 32.

BRIEF DESCRIPTION OF THE DRAWINGS

FIG. 1A to FIG. 1C show First Embodiment of the present invention. FIG. 1A is an elevational view in section of a positioning clamp in an unclamping state, in which an output device of the present invention is used. FIG. 1B corresponds to a cross section taken along a line 1B-1B in FIG. 1A. FIG. 1C corresponds to a cross section taken along a line 1C-1C in FIG. 1A.

FIG. 4A to FIG. 4B show Third Embodiment of the present invention. FIG. 4A is a diagram similar to FIG. 1A. FIG. 4B is a diagram similar to FIG. 1B.

DESCRIPTION OF EMBODIMENTS

Figure 2A:
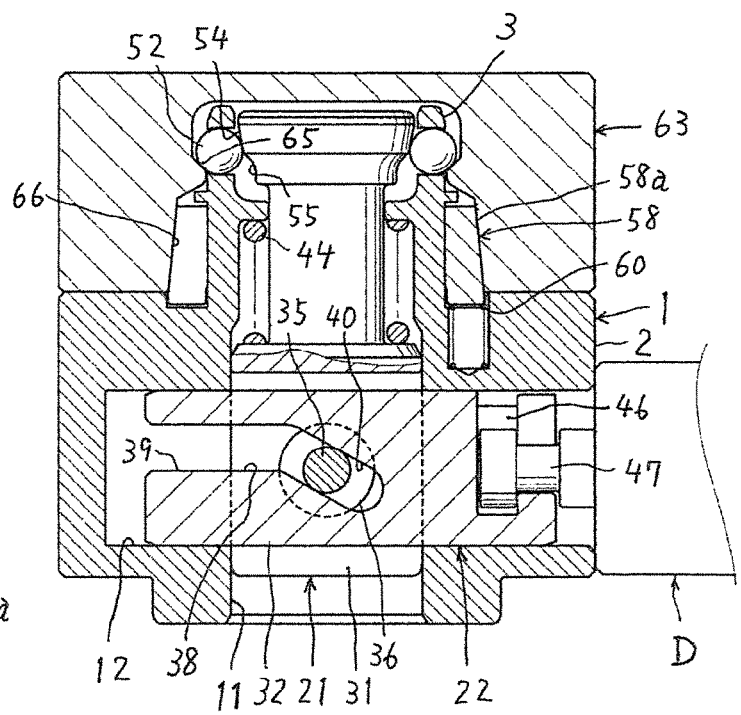
FIG. 2A shows the clamp in a clamping state, and is a diagram similar to FIG. 1A.
Figure 2B:
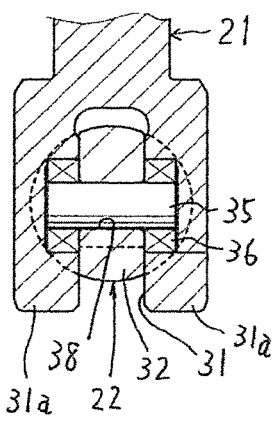
FIG. 2B is a diagram similar to FIG. 1B.

FIG. 1A to FIG. 2B show First Embodiment of the present invention.

First Embodiment deals with, by way of example, a case where an output device of present invention is used in a positioning clamp. First of all, the structure of the clamp will be described, with reference to FIG. 1A to FIG. 1C.

A housing 1 of the clamp includes: a lower housing 2, which is a main body portion; and a cylindrical plug portion 3 protruding upward unitarily with an upper portion of the lower housing 2. Components of the output device are disposed in the lower housing 2. Components of a clamp mechanism 4, which will be described later, are provided at the plug portion 3.

A first guide hole 11 is disposed in the lower housing 2 so as to extend in a vertical direction. A second guide hole 12 is disposed in the lower housing 2 so as to extend in a horizontal direction. The second guide hole 12 crosses the first guide hole 11.

A first rod 21 for output is inserted into the first guide hole 11 and a cylindrical hole 3a of the plug portion 3 so as to be movable in the vertical direction (an axial direction of the first rod 21). A second rod 22 for driving is inserted into the second guide hole 12 so as to be movable in the horizontal direction (an axial direction of the second rod 22).

A lower half portion (base-side portion) of the first rod 21 has an accommodation groove 31 extending in the horizontal direction and in the vertical direction. An insertion portion 32 provided to the second rod 22 is inserted into the accommodation groove 31.

Both side walls 31a, 31a of the accommodation groove 31 respectively support both longitudinal end portions of a pin 35, which functions as a guide member, in a rotatable manner via radial bearings 36. The insertion portion 32 of the second rod 22 has a cam groove 38 disposed so as to correspond to the pin 35. The cam groove 38 includes: a horizontal groove portion 39 and a driving groove portion 40 inclined rightward and downward. The cam groove 38 is fitted over (engaged with) a longitudinally central portion of the pin 35.

Further, a lock spring 44 is attached in a space between a spring seat 43 provided at a midway portion of the plug portion 3 and a midway portion of the first rod 21.

The second rod 22 has a T-groove 46 provided at its right portion. A T-leg 47 provided to an output portion of a drive transmission D is coupled to the T-groove 46. The drive transmission D is configured, herein, to convert rotation of a motor to movement in the axial direction and transmit the motion to the T-leg 47 after reducing the speed.

The clamp mechanism 4 is structured as follows.

An upper portion of a peripheral wall of the plug portion 3 has lateral through holes 51 arranged at predetermined intervals in a circumferential direction. In each of the through holes 51, an engagement ball 52 is inserted. An upper portion of the first rod 21 has a tapered outer circumferential surface 54 and a retraction groove 55 arranged vertically. The outer circumferential surface 54 is tapered narrower toward the lower side. A collet 58 is fitted to a lower half portion of the peripheral wall of the plug portion 3. The collet 58 has a slit 59 extending in the vertical direction. The collet 58 is configured to be radially contractible, and to be radially expandable by virtue of its resilience. The collet 58 is biased upward by advance springs 60. The plurality of advance springs 60 are arranged in the circumferential direction at predetermined intervals.

A block 63, which is to be secured to a clamped object (not illustrated) such as a work pallet, has an insertion hole 64 opened to the under surface of the block 63. Inside the insertion hole 64, an engaging hole 65 and a tapered positioning hole 66 are disposed vertically.

The above-described clamp operates as follows.

In an unclamping state shown in FIG. 1A, the second rod 22 has been retracted rightward, and as a result, the output rod 22 is raised against the lock spring 44, which allows the engagement balls 52 to move radially inward toward the retraction grooves 55. Note that, FIG. 1A shows the state where the engagement balls 52 have already been moved.

To switch the state of the clamp from the unclamping state in FIG. 1A to a clamping state in FIG. 2A, the block 63 is lowered first, as shown in FIG. 1A, so that the tapered positioning hole 66 of the block 63 is fitted over a tapered outer circumferential surface 58a of the collet 58. Then, as shown in FIG. 2A, the second rod 22 is advanced leftward.

This causes the driving groove portion 40 of the second rod 22 to lower the first rod 21 via the pin 35. Then, by virtue of the resultant of the above downward force and the biasing force of the lock spring 44, the tapered outer circumferential surface 54 of the first rod 21 pulls down the block 63 via the engagement balls 52 and the engaging hole 65. With this, the tapered positioning hole 66 of the block 63 decreases the diameter of the collet 58 to bring the inner circumferential surface of the collet 58 into close contact with the outer circumferential surface of the plug portion 3, and lowers the collet 58 against the advance springs 60. Consequently, the under surface of the block 63 is pressed onto the top surface of the lower housing 2.

To switch the state of the clamp from the clamping state in FIG. 2A to the unclamping state in FIG. 1A, the second rod 22 is retracted rightward.

The output device having the above-described structure has a simpler structure than the aforementioned known device. Thus, in addition to a reduction in production cost, downsizing of the device is achievable.

Further, the first rod 21 is supported at two upper and lower points in the first guide hole 11, and therefore guided well. As well, the second rod 22 is also supported at two left and right points in the second guide hole 12, and therefore guided well.

The pin 35 may be fixed to the side walls 31a, 31a of the accommodation groove 31, instead of being supported by the side walls 31a, 31a in a rotatable manner.

The drive transmission D may use another type of actuator such as a fluid pressure cylinder, instead of using a motor, which has been described by way of example.

Figure 3:
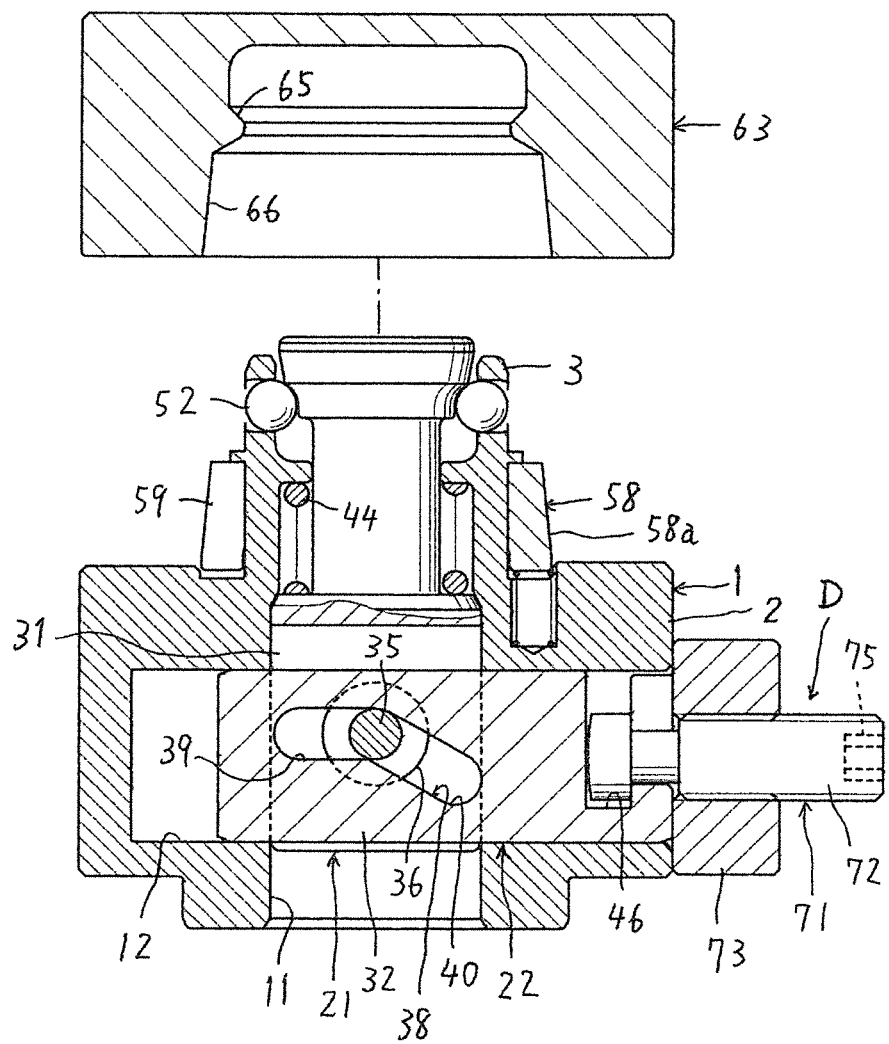
FIG. 3 shows Second Embodiment of the present invention, and is a diagram similar to FIG. 1A.

FIG. 3 shows Second Embodiment of the present invention. FIG. 4A to FIG. 4B show Third Embodiment of the present invention. In Second and Third Embodiments, the components same as or similar to the components in First Embodiment are given the same reference numerals, in principle.

Second Embodiment in FIG. 3 is different from First Embodiment in the following points.

While the horizontal groove portion 39 of the cam groove 38 opens leftward in FIG. 1A illustrating First Embodiment, a left portion of the horizontal groove portion 39 is closed in FIG. 3 illustrating Second Embodiment.

Further, the drive transmission D includes: a T-leg 71 fitted into the T-groove 46 of the second rod 22; and a nut 73 into which a male threaded portion 72 of the T-leg 71 is screwed. The nut 73 is fixed to the lower housing 2.

By rotating a hexagonal hole 75, which is provided at a right portion of the T-leg 71, using a hexagon wrench (not illustrated), the second rod 22 is advanced/retracted in the left-right direction.

Third Embodiment shown in FIG. 4A and FIG. 4B is different from First and Second Embodiments in the following points.

The both longitudinal end portions of the pin 35 are supported by the side walls 31a, 31a of the accommodation groove 31 provided in the first rod 21. A longitudinally central portion of the pin 35 is fitted (engaged) in the cam groove 38 via a radial bearing 81.

The above-described embodiments are changeable as follows.

The guide member may be a ball, a key, or the like, instead of the pin 35, which has been described by way of example.

Instead of crossing each other orthogonally, the first guide hole 11 and the second guide hole 12 may cross each other at an angle smaller than a right angle by a predetermined number of degrees.

Instead of the arrangement in which the accommodation groove 31 is disposed in the first rod 21 and the insertion portion 32 is provided to the second rod 22, the insertion portion may be provided to the first rod 21 while the accommodation groove may be disposed in the second rod 22.

Each of the radial bearings 36 and 81 may be replaceable by a roller, for example.

The first rod 21 may be configured to move upward when driven for clamping, instead of being moved downward when driven for clamping. In this case, the direction of inclination of the cam groove 38 is changed.

Instead of being used in the positioning clamp, the output device may be used in other types of clamps or various types of devices.

Moreover, it is a matter of course that other changes or alterations can be made on the present invention within the scope of envisagement of one skilled in the art.

REFERENCE SIGNS LIST

1: housing; 11: first guide hole; 12: second guide hole; 21: first rod; 22: second rod; 31: accommodation groove; 31a, 31a: side walls 32: insertion portion; 35: guide member (pin); 36: roller or bearing; 38: cam groove; 40: driving groove portion; 81: roller or bearing; D: drive transmission

The invention claimed is:

1. An output device comprising:
a first guide hole disposed in a housing;
a second guide hole disposed in the housing so as to cross a base-side portion of the first guide hole;
a first rod for output inserted into the first guide hole so as to be movable in an axial direction of the first rod;
a second rod for driving inserted into the second guide hole so as to be movable in an axial direction of the second rod;
an accommodation groove disposed in the base-side portion of the first rod, the accommodation groove extending in the axial direction of the second rod;
an insertion portion provided to the second rod so as to be inserted into the accommodation groove;
a guide member provided in the base-side portion of the first rod;
a cam groove provided in the second rod so as to directly or indirectly make an engagement with the guide member, the cam groove having a driving groove portion extending so that a distance from the axis of the second rod increases toward one of both axial ends of the second rod; and
a drive transmission connected to the second rod and configured to move the second rod in the axial direction of the second rod;
wherein both side walls of the accommodation groove respectively support both longitudinal end portions of the guide member in a rotatable manner, and a longitudinally central portion of the guide member is engaged in the cam groove provided in the insertion portion.

2. The output device according to claim 1, wherein both side walls of the accommodation groove respectively support the longitudinal end portions of the guide member in a rotatable manner via rollers or bearings.

3. An output device comprising:
a first guide hole disposed in a housing;
a second guide hole disposed in the housing so as to cross a base-side portion of the first guide hole;
a first rod for output inserted into the first guide hole so as to be movable in an axial direction of the first rod;
a second rod for driving inserted into the second guide hole so as to be movable in an axial direction of the second rod;
an accommodation groove disposed in the base-side portion of the first rod, the accommodation groove extending in the axial direction of the second rod;
an insertion portion provided to the second rod so as to be inserted into the accommodation groove;
a guide member provided in the base-side portion of the first rod;
a cam groove provided in the second rod so as to directly or indirectly make an engagement with the guide member, the cam groove having a driving groove portion extending so that a distance from the axis of the second rod increases toward one of both axial ends of the second rod; and
a drive transmission connected to the second rod and configured to move the second rod in the axial direction of the second rod;
wherein both side walls of the accommodation groove respectively support both longitudinal end portions of the guide member, and a longitudinally central portion of the guide member is engaged, via a roller or a bearing, in the cam groove provided in the insertion portion.

4. An output device comprising:
a first guide hole disposed in a housing;
a second guide hole disposed in the housing so as to cross a base-side portion of the first guide hole;
a first rod for output inserted into the first guide hole so as to be movable in an axial direction of the first rod;
a second rod for driving inserted into the second guide hole so as to be movable in an axial direction of the second rod;
an accommodation groove disposed in one of two members which are the base-side portion of the first rod and the second rod, the accommodation groove extending in the axial direction of the second rod;
an insertion portion provided to the other of the two members so as to be inserted into the accommodation groove;
a guide member provided in the base-side portion of the first rod;
a cam groove provided in the second rod so as to be directly or indirectly make an engagement with the guide member, the cam groove having a driving groove portion extending so that a distance from the axis of the second rod increases toward one of both axial ends of the second rod; and
a drive transmission connected to the second rod and configured to move the second rod in the axial direction of the second rod;
wherein both side walls of the accommodation groove respectively support both longitudinal end portions of the guide member in a rotatable manner, and a longitudinally central portion of the guide member is engaged in the cam groove provided in the insertion portion.

5. An output device comprising:
a first guide hole disposed in a housing;
a second guide hole disposed in the housing so as to cross a base-side portion of the first guide hole;

a first rod for output inserted into the first guide hole so as to be movable in an axial direction of the first rod;

a second rod for driving inserted into the second guide hole so as to be movable in an axial direction of the second rod;

an accommodation groove disposed in one of two members which are the base-side portion of the first rod and the second rod, the accommodation groove extending in the axial direction of the second rod;

an insertion portion provided to the other of the two members so as to be inserted into the accommodation groove;

a guide member provided in the base-side portion of the first rod;

a cam groove provided in the second rod so as to be directly or indirectly make an engagement with the guide member, the cam groove having a driving groove portion extending so that a distance from the axis of the second rod increases toward one of both axial ends of the second rod; and a drive transmission connected to the second rod and configured to move the second rod in the axial direction of the second rod;

wherein both side walls of the accommodation groove respectively support both longitudinal end portions of the guide member, and a longitudinally central portion of the guide member is engaged, via a roller or a bearing, in the cam groove provided in the insertion portion.

* * * * *